United States Patent [19]

Altmayer

[11] 3,984,151

[45] Oct. 5, 1976

[54] ROCK CRUSHER

[75] Inventor: Joseph Altmayer, Kitchener, Canada

[73] Assignee: E. & E. Seegmiller Limited, Kitchener, Canada

[22] Filed: Aug. 20, 1975

[21] Appl. No.: 606,050

[30] Foreign Application Priority Data

Aug. 23, 1974 Canada ............................... 207580

[52] U.S. Cl. ...................................... 308/15; 308/22

[51] Int. Cl.[2] ........................................ F16C 13/00

[58] Field of Search ............... 308/3, 15, 22, 26, 36

[56] References Cited

UNITED STATES PATENTS

| | | | |
|---|---|---|---|
| 1,007,059 | 10/1911 | Box | 308/22 X |
| 1,641,726 | 9/1927 | Bond | 308/22 X |
| 2,349,328 | 5/1944 | Aasland | 308/22 X |

*Primary Examiner*—M. H. Wood, Jr.
*Assistant Examiner*—Gene A. Church
*Attorney, Agent, or Firm*—Fetherstonhaugh & Co.

[57] ABSTRACT

A yieldable assembly for mounting the bearing block of a roller in a frame for reciprocal movement therein comprising a first piston, a cylinder for said first piston, a piston rod on said first piston and extending from said cylinder, a second piston free for movement in said cylinder independantly of said first piston, a first chamber in said cylinder partially defined by one end of said second piston, a second chamber in said cylinder partially defined by the other end of said second piston and one end of said first piston, a third chamber in said cylinder partially defined by the other end of said first piston, means for charging said first chamber with a fluid, means for selectively charging said second chamber with a fluid, means for selectively charging said third chamber with a fluid, said cylinder and said piston being connectible between the frame and the bearing block of a roller mounted therein to permit reciprocation of the bearing block in the frame as the first piston and cylinder reciprocate with respect to each other.

7 Claims, 8 Drawing Figures

ROCK CRUSHER

This invention relates to a yieldable assembly for yieldably mounting the bearing block of a roller in a crusher or the like for reciprocal movement in the crusher frame that results from the passage of a non-crushable object through the rollers.

Crushers for crushing stone and gravel consist essentially of spaced apart cooperating rollers. The size of the crushed material is controlled by the spacing of the rollers. It is common practice to yieldably mount one of the rollers so that the spacing can increase under the pressure of the passage of a non-crushable object. If no such provision is made the occurance of such an object between the crusher rolls is most likely to smash the crusher frame, break the rollers or jam the machinery.

In the past, various devices have been provided for yieldably mounting the bearing blocks of one of the rollers in a crusher. Some of these have involved mechanical spring pressure. Others have relied on a pneumatic cushion. The pneumatic cushion usually relies upon a cylinder with a gas pressure in the order of 2000 to 3000 pounds per square inch. Nitrogen is the common gas used. The pneumatic method of cushioning is reasonably satisfactory but it is very dangerous to use. Workmen must charge the cylinders of the device with nitrogen gas at a pressure in the order of 3000 pounds. If a workman should become careless and fail to achieve a tight union between the charging cylinder and the device serious injury and damage can result.

Tthis invention uses pneumatic cushioning for the yieldable mounting for the bearing assemblies in a crusher, but its use does not involve the handling of gas at a high pressure.

A further difficulty with the mounting means for the bearing block in crushers and the like of the prior art has been the difficulty and long hours of work required to relieve the mounting in cases where the crusher rolls become jammed. If the crusher rolls become jammed, it is necessary to move them apart to relieve the material. In the past this has required heavy tooling, heavy work and tedious procedures. With the present invention it is possible, by manipulation of valves and hydraulic pressures, to separate the crusher rolls in a matter of minutes and to make them operative again in a matter of minutes.

Thus, the present invention is very much safer than many of the preferred devices of the past for achieving its same function and it saves a very considerable time in the case of the machine becoming jammed.

A yieldable assembly for mounting the bearing block of a roller in a frame for reciprocal movement therein according to this invention comprises a yieldable assembly for mounting the bearing block of a roller in a frame for reciprocal movement therein comprising a first piston, a cylinder for said first piston, a piston rod on said first piston and extending from said cylinder, a second piston free for movement in said cylinder independently of said piston, a first chamber in said cylinder partially defined by one end of said second piston, a second chamber in said cylinder partially defined by the other end of said second piston and one end of said first piston, a third chamber in said cylinder partially defined by the other end of said first piston, means for charging said first chamber with a fluid, means for selectively charging said second chamber with a fluid, means for selectively charging said third chamber with a fluid, said cylinder and said piston being connectible between the frame and the bearing block of a roller mounted therein to permit receiprocation of the bearing block in the frame as the first piston and cylinder reciprocate with respect to each other.

The invention will be described as applied to a stone crusher. It is, however, intended that it be applied in other applications. The yieldable assembly for mounting the bearing block could be used in any case where there are two cooperating rollers. It would have application, for example, in the paper rollers of a paper mill. Paper mill rollers are often stressed unduly as the result of a buildup of product therebetween. The yieldable bearing block mounting assembly of this invention would have application to this machinery. With this invention the undue pressure would be relieved to save damage to the machine. Its use would be safe. Moreover, in the event of jammed rollers the assembly is capable of separating the rollers in a short period of time. The advantages of the assembly in the paper making industry would be substantially the same as those in a rock crusher. It is, therefore, not intended that the invention be restricted in application to rock crushing machines notwithstanding the fact that it will be described in association with a rock crushing machine. It can be used in any application where rollers are used and there is a problem with build up of roller pressure.

Figure 1:
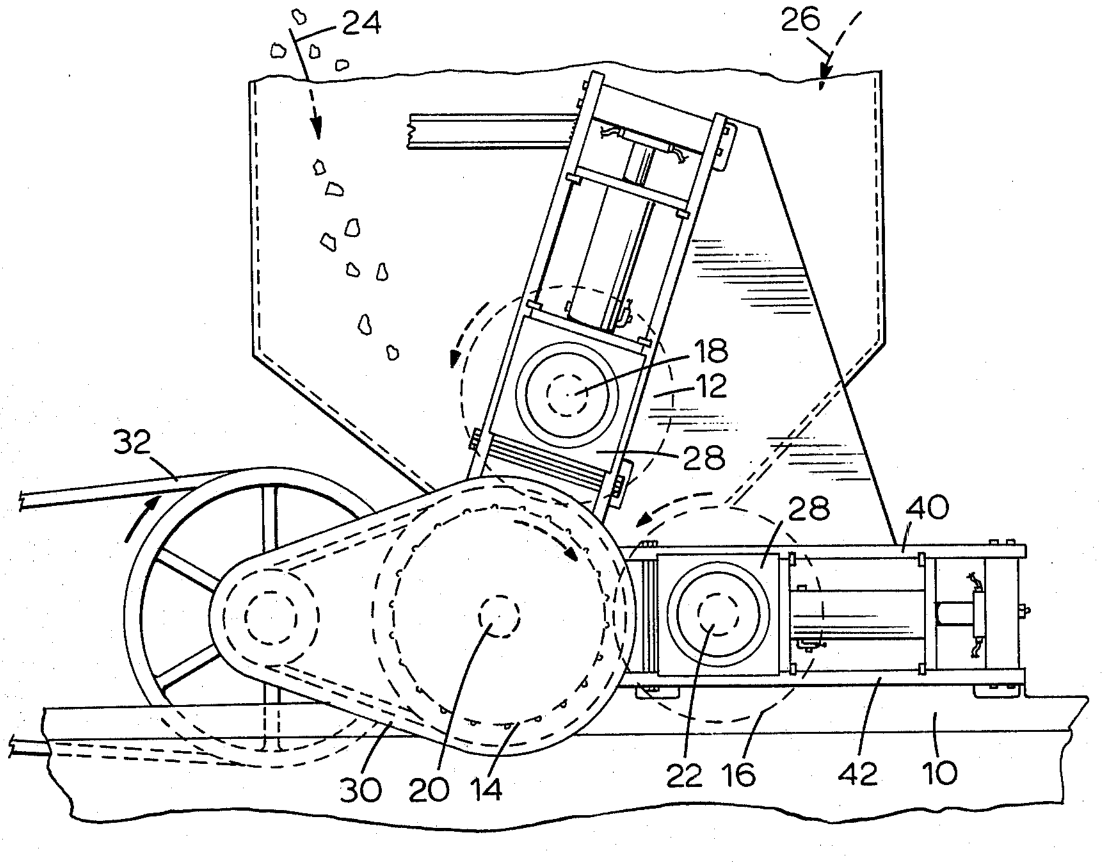
FIG. 1 is an illustration of the roller arrangement on a typical rock crusher.
Figure 2:
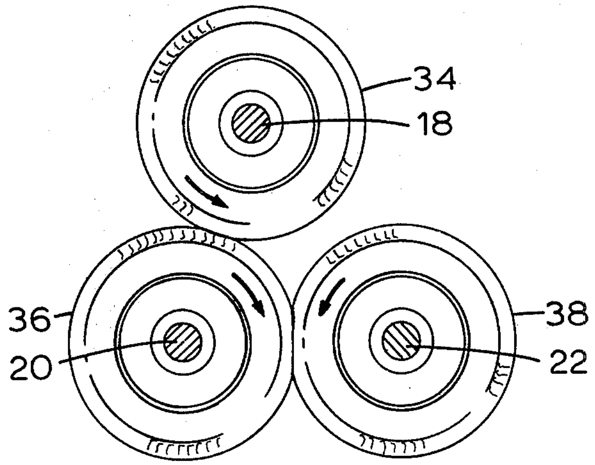
FIG. 2 is an illustration showing how drive is transferred from the driven roller shaft to the other two cooperating roller shafts.

FIG. 1 is a general illustration of a typical crusher used for crushing gravel and stone. It has a frame 10 and three crusher rollers 12, 14 and 16, each mounted on a shaft 18, 20 and 22, respectively, that is rotatably mounted in the frame to space their respective rollers apart a sufficient amount to crush the stone that is fed therethrough to the required sizes. Stone to be crushed is fed between rollers 12 and 14 in the direction of the arrow 24 and between rollers 14 and 16 in the direction of the arrow 26. It will be appreciated that the rollers 12, 14 and 16 and their respective shafts extend transversely of the machine illustrated in FIG. 1 and that there is a bearing block 28 for each shaft at each side of the machine. The shaft 20 of roller 14 is driven through belts 30 and 32 from a power source not illustrated. Power is transmitted to the shafts 18 and 22 of the rollers 12 and 16, respectively, through conventional truck tires 34, 36 and 38 which are in friction engagement and secured to their respective shafts as illustrated in FIG. 2. For the crushing of rock, one of the rollers is provided with transversely extending beads and the other two are plain.

Crushers of the general type illustrated in FIGS. 1 and 2 are, with the exception of the yieldable mounting for the rollers 12 and 16, well known in the art and further illustration of the general construction is thought to be unnecessary. It would only tend to burden the description of the invention which relates to a yieldable mounting for bearing blocks of the roller 12 and 16.

As indicated in the preamble to this specification, it is common practice to rigidly mount the bearing blocks for the roller 14, but to yieldably mount the bearing blocks for the rollers 12 and 16 so that in the event of a piece of steel or other non-crushable material is fed to the crushing rollers, the yieldably mounted roller can move outwardly to permit the passage of the indestructable piece without damaging the machinery. As indicated in the preamble of this application, various structures have been devised to provide yieldability in operation of the rollers 12 and 16. None of them approach the safety, utility and ease of operation of the present invention, nor do they provide the facility of adjustment and set up.

FIG. 1 illustrates the bearing block for the rollers 12 and 16 at one side of the machine only. It will be appreciated that the structure illustrated is duplicated at the other side where the opposite end of the rollers is rotatably mounted. Moreover, the detailed description of the yieldable mounting for the bearing blocks will be described in connection with one bearing block for roller 16.

Figure 3:
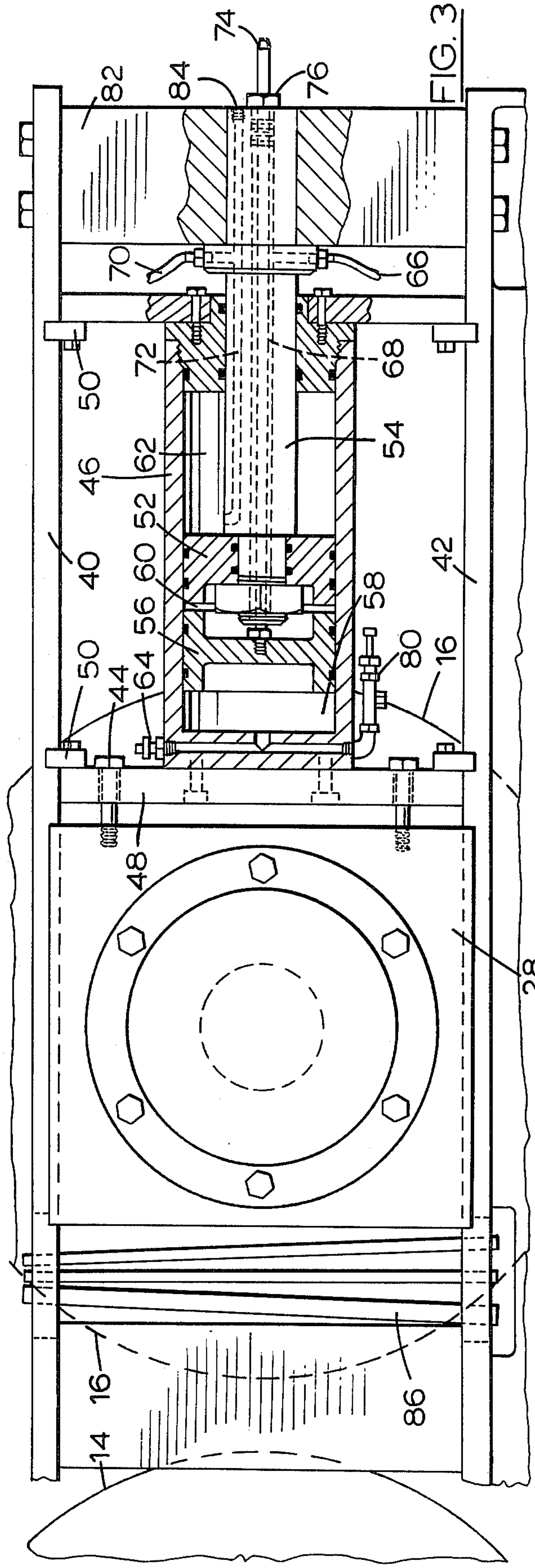
FIG. 3 is a side elevation partly in section illustrating the yieldable mounting for a roller shaft.
Figure 4:
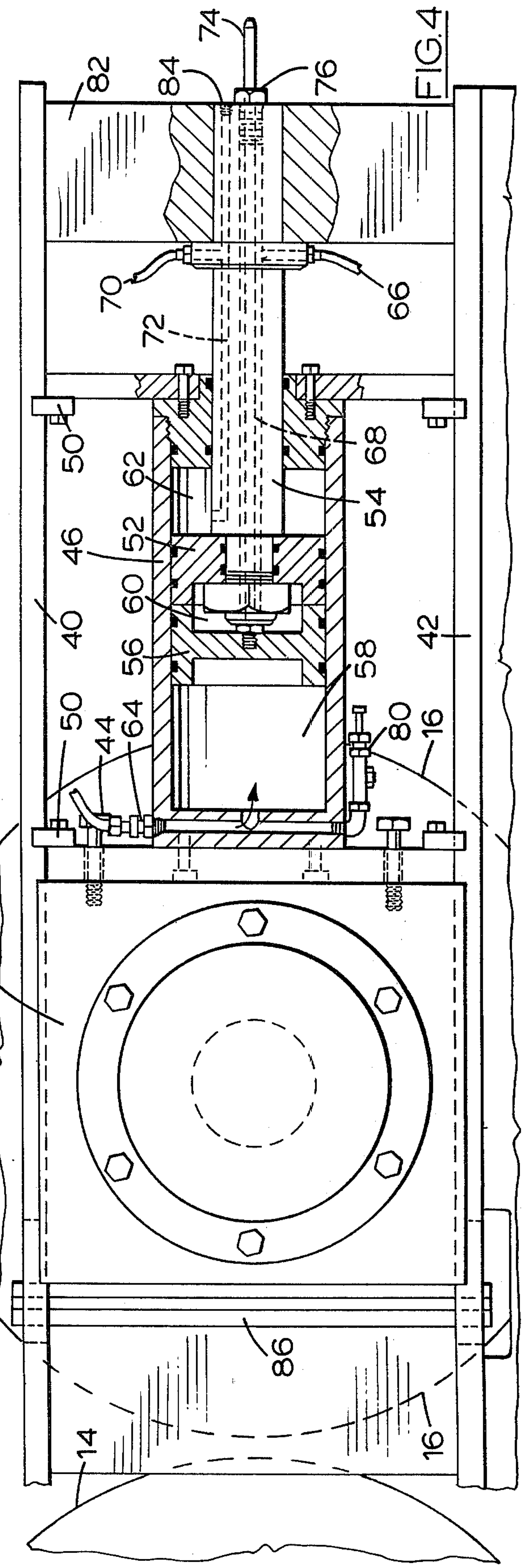
FIGS. 4 and 5 are views similar to FIG. 3 illustrating the components in different operating positions.
Figure 7:
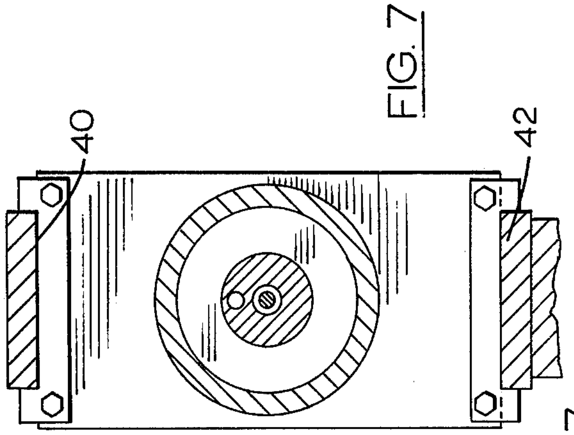
FIG. 7 is a view along the line 7—7 of FIG. 5 illustrating the mounting of the cylinder.
Figure 6:
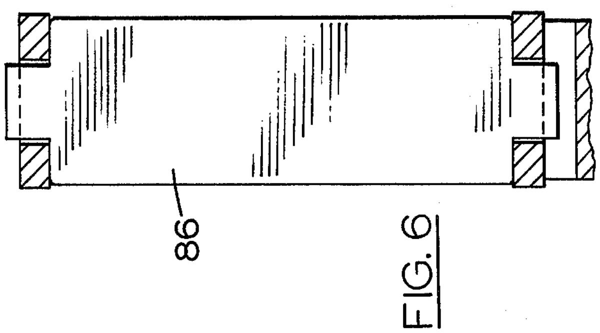
FIG. 6 is a view along the line 6—6 of FIG. 5 illustrating the manner in which the roller bearing blocks are shimmed.
Figure 8:
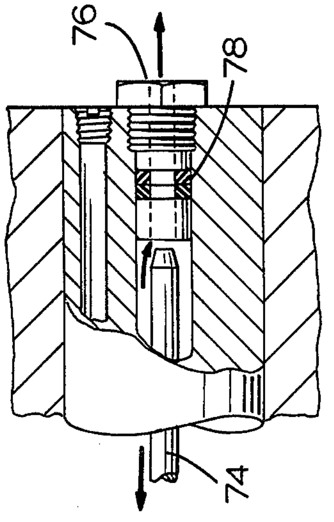
FIG. 8 is a detail illustrating the manner of operation of the hydraulic pressure safety release part.
Figure 5:
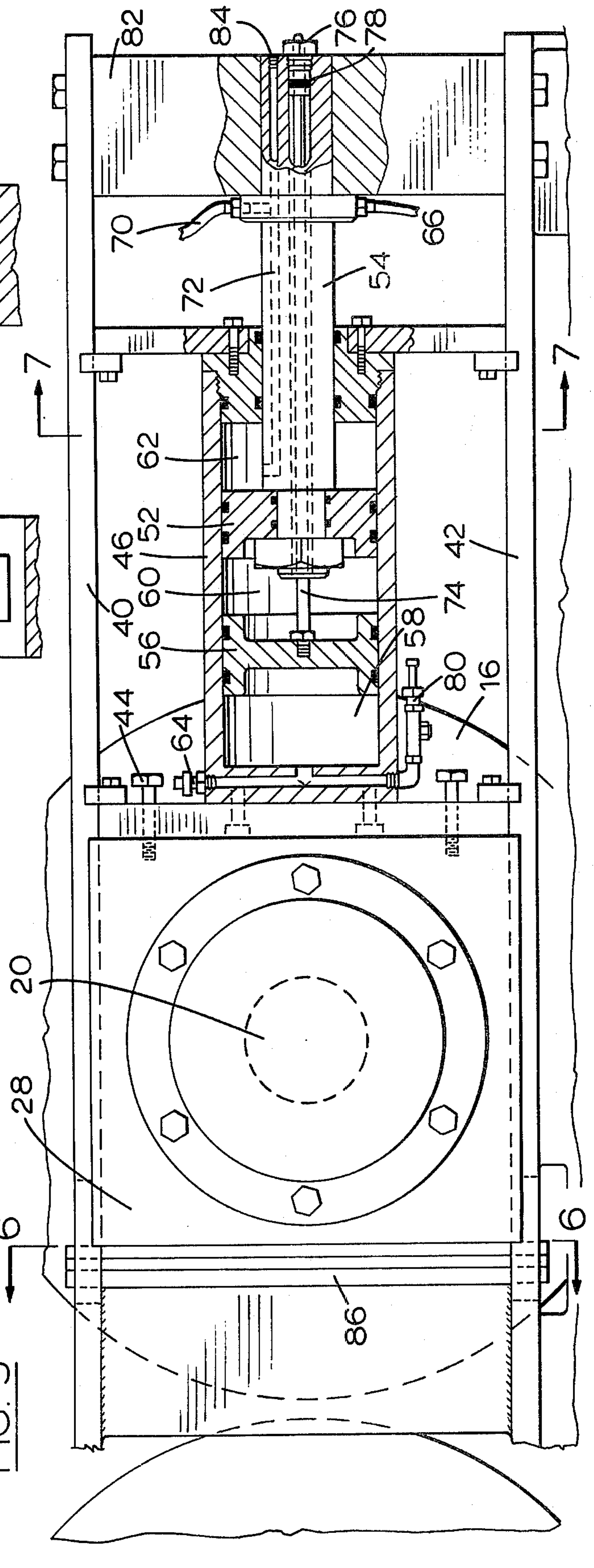

The bearing block 28 for each end of the shaft 22 of roller 16 is mounted for reciprocation in the frame 10 on upper and lower guide rails 40 and 42. It rests on the lower rail and has a flange at each of its sides that extends over the rail as illustrated in FIGS. 3, 4 and 5. The bearing blocks 28 are bolted at one end to a yieldable assembly to be described by means of bolts 44. Bolts 44 can be used as a spacing adjustment.

The yieldable assembly generally comprises a cylinder 46 rigidly bolted between spaced apart support posts 48 which are provided with bifurcated brackets 50 at their tops and bottoms that stradle the support rails 40 and 42. The cylinder of the assembly is thus free to reciprocate in the frame on the rails with the bearing blocks 28 to which it is bolted as will be described later.

The assembly comprises the cylinder 46, a piston 52 that has a piston rod 54 connected thereto for extension out of the packed end of the cylinder. The cylinder also has a second piston 56 that is free for movement therein independantly of the piston rod 54. The two pistons define three chambers within the cylinder 46. The first chamber 58 is partially defined by one end of the floating piston 56. The second chamber 60 is partially defined by the other end of the floating piston 56 and one end of the piston 52. The third chamber is partially defined by the other end of the piston 52.

A valve 64 is provided for admitting gas under pressure to the chamber 58 through the passages illustrated in the drawings. A hydraulic fluid is admitted through opening 66 and passage 68 to the second chamber 60 and a hydraulic fluid is admitted to the chamber 62 through opening 70 and passage 72. The numeral 74 refers to a rod, the free end portion of which extends through the port 76. Hydraulic sealing rings 78 seal the passage when the rod extends through the sealing rings. In conditions of operation where the floating piston 56 moves sufficiently far to the left to withdraw the free end of the rod 74 through the sealing rings 78 the interior of the chamber 60 is opened to atmosphere for reasons which will be explained later.

Numeral 80 refers to a safety blow-off valve that opens upon the attainment of a predetermined pressure for reasons which will be explained later.

The free end of the piston rod 54 is rigidly mounted to a cross member 82 of the frame. It will, thus, be apparent that as the bearing blocks 28 receiprocate on the guide rails 40 and 42, the cylinder will slide with respect to its piston 52 and piston rod 54. The pistons 52 and 56, and the end closure for the cylinders are appropriately sealed with seals as illustrated.

Numeral 84 is a plug for the outer end of the passage that extends to chamber 62.

The extension of the bearing blocks 28 towards the roller that their respective rollers cooperate with in use in a direction to the left in FIGS. 3, 4 and 5, is controlled by means of shims 86 that are retained by the aligned openings 88 in the upper and lower guide rails 40 and 42. In FIGS. 3, 4 and 5, three shims have been inserted. If it were desired to decrease the spacing between the cooperating rollers, one would reduce the number of shims. It is were desired to increase the spacing between the cooperating rollers one would increase the number of shims. The use of shims for this purpose is well known in the art.

The operation of the device is best understood from a consideration of FIGS. 3 to 5. It will be understood that these figures are sectional views of one bearing block and its mounting and that in the case of each roller there is an identical bearing block on the opposite side. It will also be understood that when reference is made to a supply of gas or hydraulic liquid to the chambers of the cylinder that similar chambers in the cylinder at each side of the machine are being supplied from the same source and at the same pressure and from the same control.

On start up the chamber 58 is pressurized with a gas such as nitrogen to a pressure of about 1000 p.s.i. It is supplied through valve 64 and when the desired pressure has been achieved valve 64 is closed. Normally, the nitrogen remains in the chamber 58 indefinitely. It does, on occasion, require topping due to escape during use as will be explained later, but under normal conditions of operation a machine may well go for a considerable period of time without the necessity of adding nitrogen to the chamber 58. Gas, at a pressure of 1000 pounds per square inch, is not dangerous to handle and any possibility of serious accident as a result of the handling of the nitrogen at high pressure is obviated with this invention.

It is usual to adjust the spacing between the rolls 14 and 16 for each particular application. Roll 14 is rigidly mounted and the spacing between the rolls is controlled by movement to the left of the bearing block as it bears against the shims 86. The spacing is, therefore, controlled by the number of shims mounted in the openings 88. To vary the number of shims, one moves the bearing block to the right and this is done by pressurizing the chamber 62 with hydraulid fluid through line 70 and passage 72. It will be apparent that pressurizing this chamber will force the cylinder to move to the right with respect to its rigidly mounted piston 52 as shown in FIG. 3. With the openings 88 exposed, one inserts the required number of shims as illustrated in FIG. 3. In that figure, three shims are shown.

A pressure of 1000 pounds in chamber 68 is not sufficient to provide the desired cushioning for operating the rollers and in order to build up the pressure in the chamber 68 one forces hydraulic oil into the chamber 60 through opening 66 and passage 68. Prior to doing this, the pressure to opening 70 is relieved and chamber is vented to an oil reservoir at atmospheric pressure. The oil pressure is released from the line 70 and provision is made for returning that oil to the reservoir as oil pressure is supplied to the line 66 to pressurize the chamber 60. As the pressure in chamber 62 is released the assembly assumes the position of FIG. 4 under the influence of the nitrogen in chamber 58.

As chamber 60 is pressurized, the floating piston 56 moves to the left to compress the nitrogen gas in the chamber 58 as shown in FIG. 4. It will be apparent that the pressure in chamber 60 will equal the pressure in chamber 58. Under normal conditions of operation it is practice to maintain a pressure of between 2200 and 2800 pounds per square inch in the chambers 58 and 60.

It will be noted that the floating piston 56 has attached thereto a rod 74 that extends rearwardly through the passage 68 of the hydraulic seals 78 of the opening at the rear of the device. The seals 78 are capable of sealing about 10,000 pounds per square inch. The rod 74 is a safety feature intended to release the pressure in the chambers 58 and 60 in the event that the operator should inadvertently increase the pressure beyond the safe operating pressure. It would, for example, be possible for an operator to pump pressure into those chambers that would break the machinery if the saftey blow off valve in the gas chamber should fail. In order to avoid this, the travel of the floating piston to the left under extreme pressure will pull the rod through the seals and permit the evacuation of the chamber 60 to relieve pressure in chamber 58. Further in the event of a gas leak the piston and rod would also move to the left and withdraw the rod from the seals to relieve the hydraulic pressure and prevent damage to the machine.

The hydraulic oil for the chambers 60 and 62 is supplied from a reservoir through a pump that has a valve to direct oil to either of the supply lines 66 and 70 as required and to relieve the pressure on these lines as required and as explained. The hydraulic pump reservoir and valving is not thought to be a part of this invention. It could be arranged in various ways by any skilled mechanic.

The pistons and cylinders have been shown with seals in a diagrammatic form in FIGS. 3 to 5 and these seals are designed to withstand the pressure involved.

As indicated, it is contemplated that for rock crushing a pump capable of delivering about 5000 pounds per square inch of hydraulic pressure is desirable. In actual practice the operating pressure in a rock crusher in the chambers 58 and 60 will be about 2200 to 2800 pounds. This could vary with circumstances and use of the device.

Numeral 80 refers to a safety relief valve which, in the case of a rock crusher, is designed to open when a pressure of about 3000 pounds per square inch is reached. This can occur when a piece of steel or other hard material that cannot be crushed is fed between the rolls. The piece of steel is larger than the opening between the rolls and as it passes through the rolls it forces the bearing block 28 to the right against the pressure of the gas in chamber 58. Gas in chamber 58 is compressed by the movement and in the event that the pressure exceeds the value of the safety release valve 80 the valve opens to permit the escape of gas. There is, thus, no danger that a piece of steel or the like can force the assembly to the right a sufficient amount to break the rolls and/or the frame. This valve should also function if pressure in the chamber 60 becomes excessive.

In normal conditions of operation, a piece of steel or the like would pass through the rollers to move the bearing block to the right and upon passing the bearing block would move to the left to assume its normal position against the shims. There would be a momentary increase in pressure. In the interval about 20 pounds per square inch of gas pressure may have been lost from the chamber 58. Under these conditions of operation, the oil pressure in chamber 16 would also be reduced because the pump that brought it up to pressure is not continually operated. It is brought up to pressure and the line is closed to maintain the pressure. However, should the pressure drop as a result of operation of the valve 80 a number of times, it is a simple matter to bring the pressure up again by applying further pressure through the line 66 to bring the pressure up to normal operating pressure again. This is a very much simplified procedure over attempting to recharge the chamber 58 with gas because the supply of gas at operating pressures of about 3000 pounds per square inch is very dangerous.

Thus, with this invention there is a safety valve 80 that will permit relief of excessive pressures when a piece of steel or the like passes through the rollers to protect the machinery and there is a safe way controlled by the mere application of a hydraulic pump to bring the gas pressure up again to normal operating pressure to protect personel.

A very practical advantage of the present machine is the manner in which the rollers 20 can be separated in the event that they should become plugged with aggregate. In the event that the rollers become plugged, it is necessary to separate them to remove the aggregate. In the past it has been a time consuming and hard job to release the bearing blocks from their mountings to separate the rollers. With the present invention, one merely releases the pressure from the chamber 60 and pressurizes the chamber 62. It will be apparent that by pressurizing chamber 62 the cylinder will move to the right with respect to the frame and the piston 52 that is rigidly mounted therein. This movement will carry the bearing block to the right to clear the rolls. The whole procedure can be done within a matter of minutes. In the past it has been customary to take in the order of 5 hours to clear a plugged roller.

What is claimed is:

1. A yieldable assembly for mounting the bearing block of a roller in a frame for reciprocal movement therein comprising

- a first piston,
- a cylinder for said first piston,
- a piston rod on said first piston and extending from said cylinder,
- a second piston free for movement in said cylinder independantly of said first piston,
- a first chamber in said cylinder partially defined by one end of said second piston,
- a second chamber in said cylinder partially defined by the other end of said second piston and one end of said first piston, a third chamber in said cylinder partially defined by the other end of said first piston,
means for charging said first chamber with a fluid,
means for selectively charging said second chamber with a fluid,
means for selectively charging said third chamber with a fluid,
said cylinder and said piston being connectible between the frame and the bearing block of a roller mounted therein to permit reciprocation of the bearing block in the frame as the first piston and cylinder reciprocate with respect to each other.

2. A yieldable assembly for mounting a bearing block of a roller in a frame for reciprocal movement therein as claimed in claim 1 in which said first chamber has a safety blow off valve adapted to open upon the exceeding of a predetermined pressure in said first chamber.

3. A yieldable assembly for mounting a bearing block of a roller in a frame as claimed in claim 1 in which said second chamber has a relief port and means for opening said relief port when the volume of said second chamber exceeds a predetermined amount.

4. A yieldable assembly for mounting the bearing block of a roller in a frame for reciprocal movement therein as claimed in claim 1 in which said piston is connected to said frame and said cylinder is connected to said bearing block.

5. A yieldable assembly for mounting a bearing block of a roller in a frame as claimed in claim 2 in which said second chamber has a relief port and means for opening said relief port when the volume of said second chamber exceeds a predetermined amount.

6. A yieldable assembly for mounting the bearing block of a roller in a frame for reciprocal movement therein as claimed in claim 2 in which said piston is connected to said frame and said cylinder is connected to said bearing block.

7. A yieldable assembly for mounting the bearing block of a roller in a frame for reciprocal movement therein as claimed in claim 3 in which said piston is connected to said frame and said cylinder is connected to said bearing block.

* * * * *